United States Patent [19]
Bayer et al.

[11] Patent Number: 5,562,885
[45] Date of Patent: Oct. 8, 1996

[54] EXHAUST GAS CATALYTIC CONVERTER

[75] Inventors: Jürgen Bayer, Esslingen; Andreas Grüner, Göppingen; Bohumil Humpolik, Ludwigsburg; Karl Lochmahr, Vaihingen/Enz; Thomas Reimet, Korntal-Münchingen, all of Germany

[73] Assignee: Emitec Gesellschaft fuer Emissionstechnologie mbH, Lohmary, Germany

[21] Appl. No.: 217,583

[22] Filed: Mar. 24, 1994

Related U.S. Application Data

[63] Continuation of PCT/EP92/02116, Sep. 15, 1992.

[30] Foreign Application Priority Data

Sep. 28, 1991 [DE] Germany ............ 41 32 439.0

[51] Int. Cl.$^6$ ............................................. F01N 3/10
[52] U.S. Cl. .................... 422/174; 422/173; 422/180; 422/199; 422/222; 60/300
[58] Field of Search .................. 422/222, 211, 422/173–174, 180, 199; 502/439, 527; 60/299–300; 219/552–553, 540; 392/485–486, 494; 55/DIG. 30, 466

[56] References Cited

U.S. PATENT DOCUMENTS

| | | | |
|---|---|---|---|
| 3,768,982 | 10/1973 | Kitzner et al. | 422/174 |
| 3,770,389 | 10/1973 | Kitzner et al. | 422/174 |
| 3,889,464 | 6/1975 | Gardner | 60/286 |
| 4,263,577 | 4/1981 | Bauchert et al. | 219/552 |
| 4,506,251 | 3/1985 | Naruo et al. | 219/552 |
| 4,544,388 | 10/1985 | Rao et al. | 422/178 |
| 4,928,485 | 5/1990 | Whittenberger | 422/180 |
| 4,942,020 | 7/1990 | Whittenberger et al. | 422/180 |
| 4,976,929 | 12/1990 | Cornelison et al. | 422/174 |
| 5,144,798 | 9/1992 | Kojima et al. | 60/303 |
| 5,146,743 | 9/1992 | Maus et al. | 422/174 |
| 5,294,411 | 3/1994 | Breuer et al. | 422/174 |

FOREIGN PATENT DOCUMENTS

| | | | |
|---|---|---|---|
| 0233860 | 8/1987 | European Pat. Off. | F01N 3/02 |
| 0275372 | 7/1988 | European Pat. Off. | F01N 3/02 |
| 0401646 | 12/1990 | European Pat. Off. | F01N 3/28 |
| 0419906 | 4/1991 | European Pat. Off. | F01N 3/28 |
| 563757 | 7/1930 | Germany . | |
| 2230663 | 1/1975 | Germany | F01N 3/10 |
| 2951316 | 7/1981 | Germany | F01N 3/10 |
| 8621551.5 | 11/1986 | Germany | F01N 3/38 |
| 8816514.0 | 12/1989 | Germany | F01N 3/28 |
| 3903879 | 8/1990 | Germany | B01J 37/08 |
| 8905073.8 | 10/1990 | Germany | F01N 3/28 |
| 3929521 | 3/1991 | Germany | B01J 35/02 |
| 4016276 | 6/1991 | Germany | B01J 35/04 |
| 1160940 | 6/1985 | U.S.S.R. | F01N 3/28 |
| 89/10471 | 11/1989 | WIPO | F01N 3/20 |

*Primary Examiner*—Robert Warden
*Assistant Examiner*—Hien Tran
*Attorney, Agent, or Firm*—Herbert L. Lerner; Laurence A. Greenberg

[57] ABSTRACT

An exhaust gas catalytic converter, particularly for an internal combustion engine, includes a flow channel for carrying exhaust gas. A carrier body is disposed in the flow channel and has a structure through which exhaust gas can flow. The carrier body is formed of sheet-metal layers. At least some of the sheet-metal layers are at least partially structured. A catalytic coating is disposed in the carrier body. At least one separate heating element in addition to the structure, is adapted to the shape of one of the at least partially structured sheet-metal layers, is electrically insulated from the structure and is in close thermal contact with at least one of the coating and the sheet-metal layers, for electrically heating the carrier body externally. A method for producing an exhaust gas catalytic converter includes placing spaced-apart heating elements adapted to a shape of a corrosion-proof structured sheet-metal layer into the structured sheet-metal layer. At least one other sheet-metal layer is then wound, looped or layered with the structured sheet-metal layer to form a carrier body.

10 Claims, 2 Drawing Sheets

EXHAUST GAS CATALYTIC CONVERTER

CROSS-REFERENCE TO RELATED APPLICATION

This application is a Continuation of International Application Ser. No. PCT/EP92/02116, filed Sep. 15, 1992.

BACKGROUND OF THE INVENTION

Field of the Invention

The invention relates to an exhaust gas catalytic converter, particularly for an internal combustion engine, including a carrier body being formed of sheet-metal layers and having a structure through which exhaust gas can flow for receiving a catalytic coating, the carrier body being disposed in a flow channel carrying the exhaust gas and being externally heatable. The invention also relates to a method for producing the exhaust gas catalytic converter.

In such catalytic converters as well, improved efficiency in catalytic reburning of exhaust gases prevails at higher operating temperatures. In order to attain improved conversion performance, particularly in the cold-starting phase, while the catalytic converter is still at low operating temperatures, it is known to heat the metal carrier body electrically. The electrical power supply of the vehicle is used as the current source therefor. The electrical heating can be turned off once the catalytic converter, or the carrier body provided with the catalytic coating, has reached its operating temperature because of the flow of the hot exhaust gas through it.

In a catalytic converter of that generic type, which is known from Published International Application WO 89/10471, an electrically conductive carrier body is provided, which includes wound, stacked or otherwise stratified corrosion-proof metal sheet-metal layers. The sheet-metal layers are disposed in such a way as to lend the carrier body a structure, for a catalytic coating, that exhaust gas can flow through. That is attained in particular by layering smooth sheet-metal layers and corrugated sheet-metal layers alternatingly on one another. That kind of carrier body, which may have various cross-sectional shapes, is then received in a flow channel or jacket housing that carries the exhaust gas flow. In order to heat the carrier body, it is connected to a voltage source, in particular the power supply of the motor vehicle. The electrical resistance of the carrier body serves to heat it. The carrier body has gaps and/or electrically insulating intermediate layers to achieve an electrical separation.

In a catalytic converter known from U.S. Pat. No. 3,770,389, a carrier body of ceramic material for a catalytic coating is provided that has the shape of a hollow cylindrical structure with an annular cross-sectional area. In a central hollow space of the carrier body, which has a flow passing through it axially, there is a carrier body including sheet-metal layers and having a catalytic coating. That body substantially includes an axially disposed metal bar which is spirally wound about by a steel band. If that kind of metal carrier body is connected to a voltage source, its electrical resistance causes heating. In the starting phase, that results in improved efficiency and leads to heating of the monolithic carrier body. Once the latter has reached its operating temperature, the metal carrier body is disconnected from the voltage source.

Another model is known from German Published, Prosecuted Application DE-AS 22 30 663. In that case, a ceramic carrier body which is constructed as a hollow cylinder is heated by a centrally disposed electrical heating element. The heating element, which is constructed to be self-insulating, has a heating coil that is disposed in a metal cylinder and is connected to a power supply.

Published European Application No. 0 233 860 A3 discloses an apparatus for cleaning combustion exhaust gases of an internal combustion engine, in particular a Diesel engine. That apparatus has a retaining or filter device in which finely divided condensates or particles such as soot can be retained. The filter body of the particle retaining or filter device, for instance, includes a wound steel nonwoven material with catalyst-coated metal elements having interstices or a catalyst-coated honeycomb filter. For instance, if after relatively long operation of the engine, soot sticks firmly in the filter device, the layer must be removed from the catalytic surface. That is done by the burn-off initiating device (heating cartridge), having a surface which is likewise provided with a catalytic lining and having a surface which rests directly on the filter body. By electrically heating the heating cartridge, burn-off of the soot layer on its surface and therefore in the filter body is initiated, since the burnoff front created at the heating cartridge jumps over to the filter body, where it propagates through the filter body.

U.S. Pat. No. 3,889,464 describes an embodiment of a catalytic converter having channels, that are catalytically coated on their inner surface, which form a honeycomb structure, and in which wires are pulled along the centers of the channels, with the wires being electrically connected into empty space and connected between the terminals, each at the end surfaces of the honeycomb body. That causes indirect heating of the catalytic surface of the honeycomb body. In another embodiment, the catalytic converter is formed essentially by likewise heatable heating elements extending in a hollow chamber along the flow direction of the fluid. They are likewise catalytically coated on their surface and therefore lead to direct heating of the catalytic converter.

SUMMARY OF THE INVENTION

It is accordingly an object of the invention to provide an exhaust gas catalytic converter, which overcomes the hereinafore-mentioned disadvantages of the heretofore-known devices of this general type and which has a carrier body with a high mechanical strength, is rapidly heatable, and can be manufactured simply.

With the foregoing and other objects in view there is provided, in accordance with the invention, an exhaust gas catalytic converter, particularly for an internal combustion engine, comprising a flow channel for carrying exhaust gas; a carrier body being disposed in the flow channel and having a structure through which exhaust gas can flow, the carrier body being formed of sheet-metal layers, at least some of the sheet-metal layers being at least partially structured; a catalytic coating disposed in the carrier body; and at least one separate heating element in addition to the structure, being adapted to the shape of one of the at least partially structured sheet-metal layers, being electrically insulated from the structure and being in close thermal contact with the coating and/or the sheet-metal layers, for electrically heating the carrier body externally.

Therefore, outside the structure, there is at least one separate electrically insulated heating element, which is in intimate thermal contact with the sheet-metal layers and/or their coating in the carrier body.

As compared with the known catalytic converters that exploit the electrical resistance of the carrier body, the embodiment according to the invention makes it possible to attain the electrical heating of the carrier body, which is made up of sheet-metal layers, without lessening its mechanical strength. In the known catalytic converters, the aforementioned gaps or insulating layers in the carrier body can lessen its strength. By comparison, the at least one separate heating element provided in the catalytic converter of the invention is insulated from the structure and constructed separately. Thus no special insulation provisions need to be made in the carrier body itself.

In the catalytic converter of the invention, the elimination of special insulation provisions leads to simple, economical manufacture. Since the at least one heating element is in direct contact, and especially areal contact, with the sheet-metal layers and/or the coating of the carrier body, a good heat transfer between the surface of the heating element and the sheet-metal layers is assured. As a result, localized excessive heating, which might possibly cause destruction of the carrier body, can be avoided.

The catalytic converter according to the invention has a carrier body, which is built up of sheet-metal layers, that can be heated rapidly with the heating element disposed in it. Thus even in the starting phase of an internal combustion engine, high efficiency of conversion of the exhaust gas is attained.

In accordance with another feature of the invention, there is provided at least one cylindrical or bar-shaped electrical heating element of small diameter. Heating elements of this kind, which are known in principle, have a low flow resistance to the exhaust gas flow.

In accordance with a further feature of the invention, the at least one bar-shaped heating element is held on a corrugated sheet-metal layer of the carrier body.

In accordance with an added feature of the invention, the shape of the corrugation of the corrugated sheet-metal layer is adapted to the diameter of the heating element. As a result, particularly good areal contact and therefore good heat transfer between the surface of the heating element and the corrugated sheet-metal layer are attained, so that burning through of the heating element or localized overheating of the corrugated sheet-metal layer can be avoided. Another advantage is that additional provisions for securing the heating element inside the carrier body or onto it are dispensed with.

In accordance with an additional feature of the invention, the carrier body includes at least one spirally wound smooth sheet-metal layer, a corrugated sheet-metal layer through which a flow is possible being disposed between the wound layers of smooth sheet-metal layer, and a plurality of bar-like heating elements being laid and spaced apart from one another in the corrugated sheet-metal layer. The heating elements, which are thus disposed coaxially with the exhaust gas flow and are distributed over the cross section of the carrier body, lend the carrier body particularly high strength. Due to the solid bond with the structure of the carrier body, additional fasteners or provisions for fastening the heating elements can be dispensed with. The brazing process required for manufacturing the catalytic converter simultaneously leads to brazing of the heating elements to the sheet-metal layers disposed in their vicinity. Advantageously, once again, a plurality of heating elements distributed over the entire cross-sectional area are provided, leading to especially uniform and very fast heating of the carrier body.

In accordance with yet another feature of the invention, the at least one electrical heating element has a smooth flat shape and is received as a smooth sheet-metal layer in the carrier body. Alternatively, foil-like heating elements may be applied to the smooth sheet-metal layers of the carrier body.

In accordance with yet a further feature of the invention, the heating elements are made flexible in such a manner that they can be disposed in the form of spirally wound smooth sheet-metal layer in the carrier body. Once again, it may alternatively be provided that foil-like heating elements are applied to a spirally wound smooth sheet-metal layer.

In accordance with yet an added feature of the invention, there are provided opposed leads of the at least one electrical heating element being extended out of the end surfaces of the carrier body and connected to a voltage source.

In accordance with yet an additional feature of the invention, the leads, associated with an end surface of a plurality of electrical heating elements, are connected to one another, and at least one group of leads is provided with a power cable that is passed through a jacket housing of the carrier body. Joining the leads together can be done by means of a suitably disposed conductive steel sheet-metal layer, for instance. Only one cable duct through the jacket housing for one group of leads is necessary, since the other group of leads can be conductively connected to the jacket housing itself. In that case, one pole of the power supply is then connected to the jacket housing.

With the objects of the invention in view, there is also provided a method for producing an exhaust gas catalytic converter, especially for an internal combustion engine, in which a carrier body built up of corrosion-proof sheet-metal layers is wound spirally or otherwise looped or layered, in particular from smooth and corrugated sheet-metal layers, which comprises laying cylindrical heating elements, being adapted to the structure of the sheet-metal layers and being spaced apart from one another, into the sheet-metal layers, before or during the winding of the sheet-metal layers, and then winding the carrier body. As a result, particularly good binding of the heating elements to the structure of the carrier body is attained, and moreover an especially strong carrier body is created. A subsequent method step for introducing the heating elements into the carrier body is dispensed with as well. Finally, carrying out this method also means that after manufacture, there is a particularly good heat transfer between the heating elements and the carrier body.

In accordance with another mode of the invention, there is provided a method which comprises winding a flat, flexible heating element in the carrier body, together with the smooth and corrugated sheet-metal layers. Once again, a particularly good bond of the heating element with the structure of the carrier body is attained.

In accordance with again another feature of the invention, the sheet-metal layers of the carrier body are disposed by a star winding technique, and a preformed heating element, which has a shape adapted to the flowthrough structure of the carrier body, is introduced into the carrier body. Such a carrier body for an exhaust gas catalytic converter is known in principle from German Patent DE 40 16 276 C1. Before the carrier body is wound, the preformed heating element is introduced into the sheet-metal layers of the carrier body. After the winding of the carrier body, the preformed heating element is firmly bound in with the structure of the heating body. In such a carrier body made by the star winding technique, the elimination of additional insulation provisions and the introduced heating element result in an increase in strength of the carrier body. The three-dimensional shaping of the heating element makes the induction of heat uniform and rapid over the entire cross section of the carrier body.

In accordance with again a further feature of the invention, the heating element has a three-dimensional meandering structure.

In accordance with again an added feature of the invention, the heating element has power supply leads being disposed outside the flow channel.

If a plurality of heating elements that are distributed over the cross section and depth of the carrier body are used, then particularly good, uniform heating of the carrier body is attained. Since the electrical heating elements are constructed to be self-insulating, special insulation provisions can be dispensed with.

In accordance with a concomitant feature of the invention, in all of the embodiments, there is provided a plurality of heating elements being distributed over the cross section and/or the depth of the carrier body.

Other features which are considered as characteristic for the invention are set forth in the appended claims.

Although the invention is illustrated and described herein as embodied in an exhaust gas catalytic converter and a method for producing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
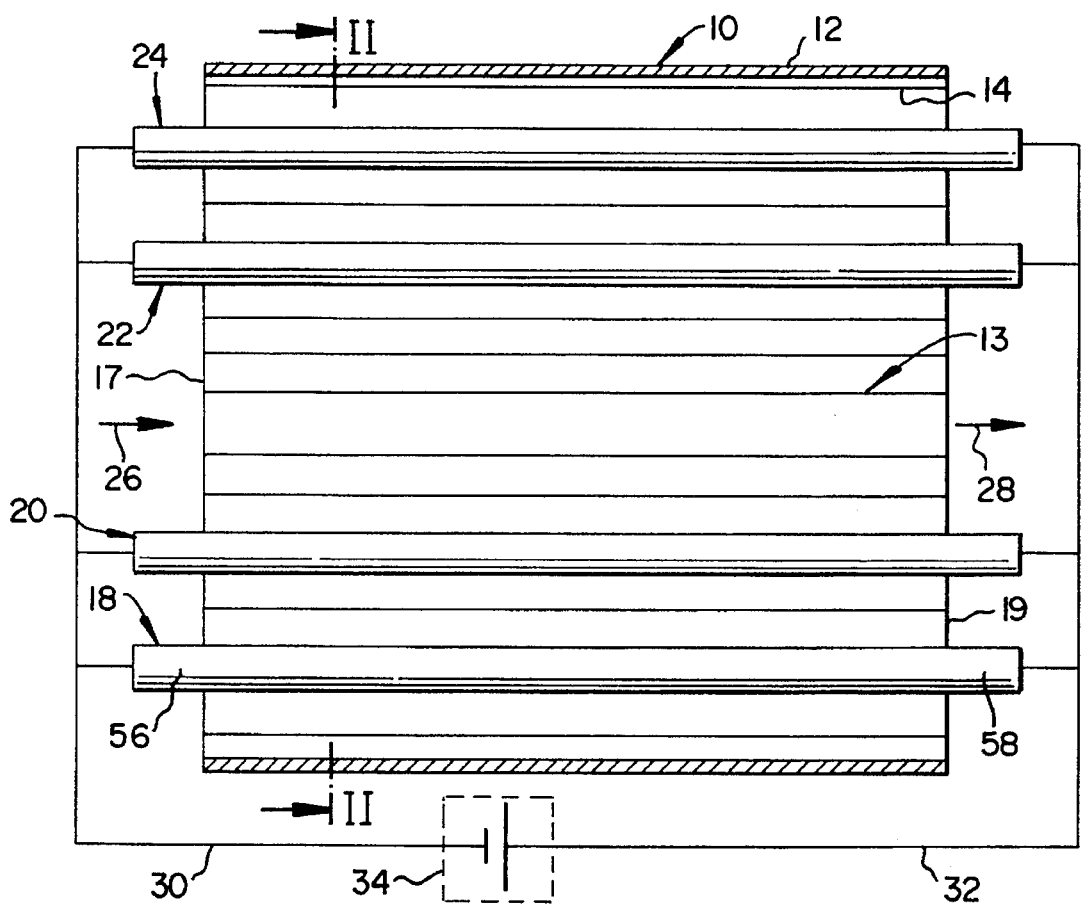
FIG. 1 is a diagrammatic, longitudinal-sectional view of a first embodiment of the invention.
Figure 5:
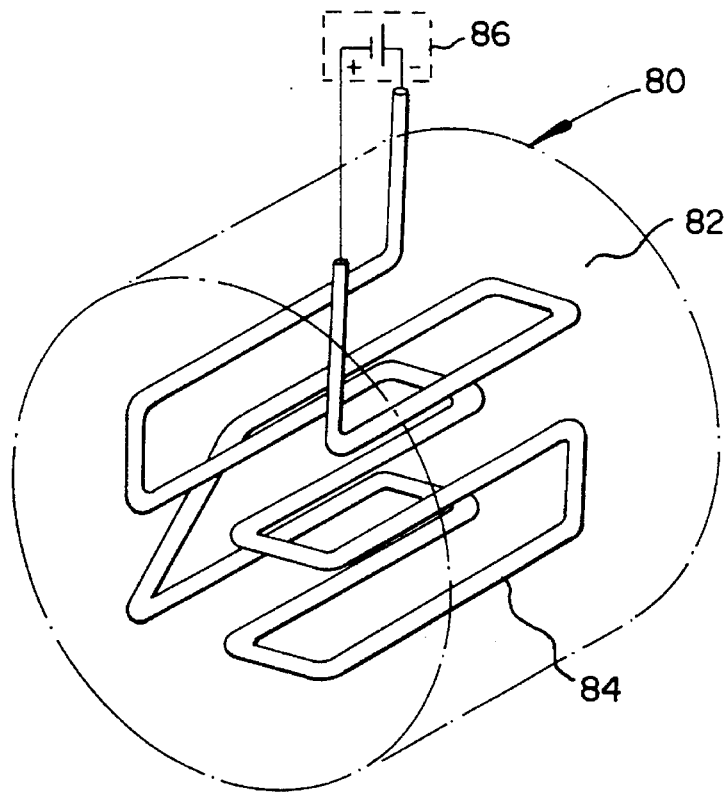
FIG. 5 is a perspective view of a further embodiment with a carrier body wound according to the star winding technique.

Referring now to the figures of the drawing in detail and first, particularly, to FIGS. 1 and 5 thereof, there are seen exhaust gas catalytic converters which serve to convert or catalytically reburn exhaust gases that are output by an internal combustion engine of a passenger car. With heating elements used in the catalytic converters, the intent is to achieve higher efficiency in exhaust gas conversion in the starting phase of the engine. The heating elements heat a carrier body along with its catalytic coating, and as a result the catalytic converter reaches it operating temperature faster.

A catalytic converter 10 shown in a diagrammatic longitudinal section in FIG. 1 has a cylindrical jacket housing 12, produced from special steel, which defines a flow channel carrying exhaust gas and which receives a carrier body 13 that is likewise cylindrical in cross section.

Figure 2:
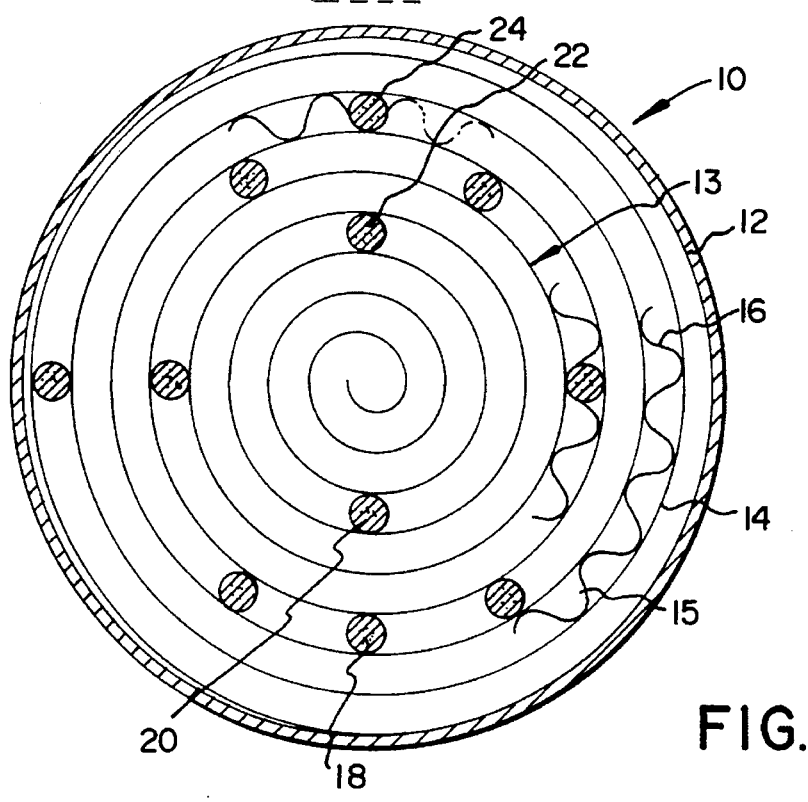
FIG. 2 is a longitudinal-sectional view taken along a line II—II of FIG. 1, in the direction of the arrows.

As is seen from FIG. 2, the carrier body 13 includes a spirally wound smooth sheet-metal layer 14 in winding layers which are spaced apart from one another. The spacing of the winding layers of the smooth sheet-metal layer 14 is assured by means of a corrugated sheet-metal layer 16 that is disposed between the opposed winding layers. Both the smooth sheet-metal layer 14 and the corrugated sheet-metal layer 16 of the carrier body 13 are produced from a high-temperature-resistant, corrosion-proof sheet-metal layer.

The above-described layout of the carrier body 13 forms a structure through which exhaust gas can flow, having interstices 15 through which the exhaust gas flows in the direction of arrows 26 and 28. The exhaust gas enters the carrier body 13 at an upstream end surface 17 and leaves it at a downstream end surface 19. The conversion of the exhaust gas takes place during this flow through the carrier body 13.

Figure 4:
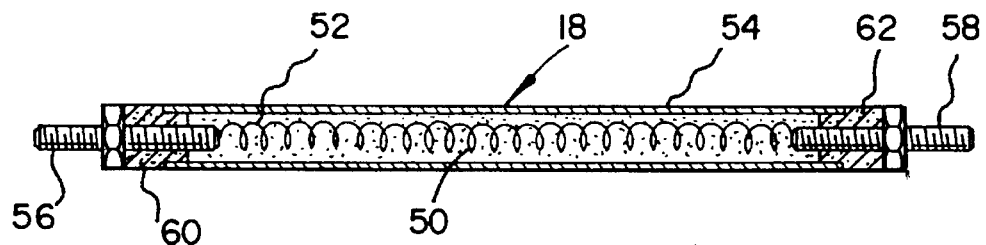
FIG. 4 is a longitudinal-sectional view of a heating element for the embodiment of FIGS. 1–3.

A plurality of electrical heating elements 18, 20, 22, 24, each of fundamentally identical construction, is incorporated in the carrier body 13 and distributed over its cross section. FIG. 4 shows one such heating element 18 on a larger scale. The heating element 18, like all of the other heating elements, has a heating coil 50 that is laid spirally between two spaced-apart leads 56 and 58. The heating coil 50 is insulated from a cylindrical jacket tube 54 by an insulating layer 52. A compressed layer of sand can be used for this purpose, by way of example. The insulation of the cylindrical jacket tube 54 from the leads 56, 58 is performed by means of ceramic insulators 60, 62, which are disposed on opposed end surfaces of the jacket tube 54.

As is seen from FIG. 1, the length of the heating elements 18, 20, 22, 24 is dimensioned in such a way that at least the leads 56, 58 protrude axially past the end surfaces 17, 19 of the carrier body 13. In a diagrammatically illustrated manner, the leads 56, 58 of the heating elements 18, 20, 22, 24 are connected to a power supply 34 of the motor vehicle. Accordingly, the electrical layout of the heating elements 18, 20, 22, 24 is performed in such a way that they can be operated with the voltage typically available in motor vehicles at present, that is 12 Volts.

As can be seen from the view of FIG. 1, the leads of the heating elements 18, 20, 22, 24 are located in the region of the flow of exhaust gas. In a diagrammatically illustrated manner, the leads 56, 58 of the heating elements 18, 20, 22, 24 that are located in the region of one end surface 17, 19 can be joined together and each connected to a common power line 30, 32. In a departure from the view of FIG. 1, the conductivity of the jacket tube 12 may also be exploited. In that case, the line 32 is connected to the jacket tube 12, which in turn is connected to one pole of the power supply 34.

FIG. 2 clearly shows that the heating elements 18, 20, 22, 24 are placed in the corrugated shape of the corrugated sheet-metal layer 16. As a result, special fastening provisions for the heating elements 18, 20, 22, 24 for assuring their secure fixation in the cross section of the carrier body 13 can be dispensed with. Since the diameter of the heating elements 18, 20, 22, 24 is adapted to the shape of the corrugation of the corrugated sheet-metal layer 16, particularly good areal contact between the jacket tube 54 of the heating element and the sheet-metal layers 14 and 16 of the carrier body, and therefore good heat transfer, are assured, since a larger heat transfer area is available. On one hand, this leads to very fast heating of the carrier body 13, and on the other hand it prevents localized overheating that can lead to destruction of the carrier body 13. The uniform heating of the carrier body 13 over its entire cross section is attained by distributing a plurality of the heating elements 18, 20, 22, 24 over its cross section.

Figure 3:
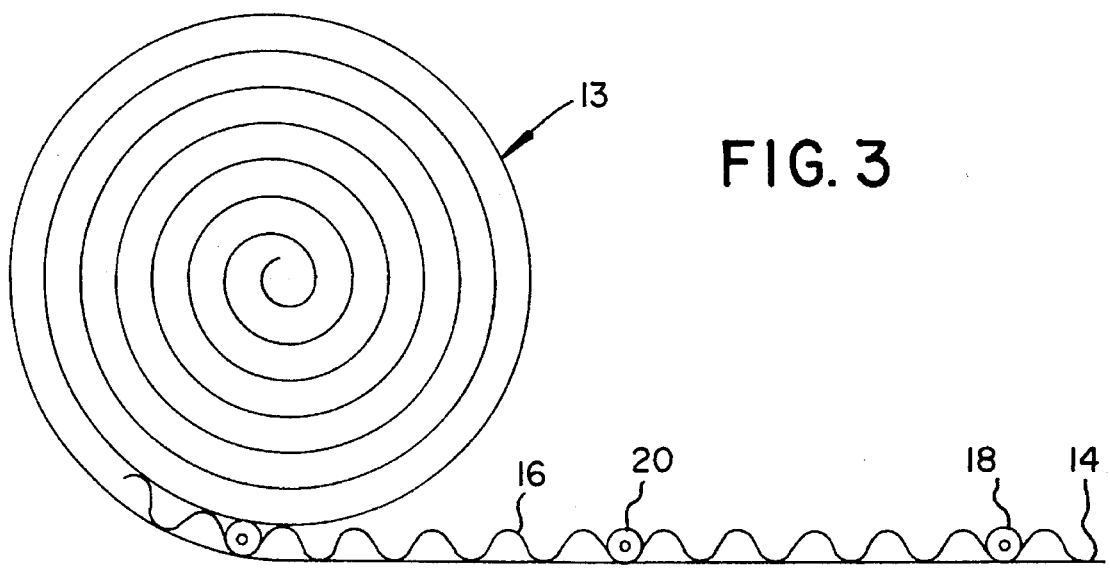
FIG. 3 is an end-elevational view used to explain the production of a carrier body in the embodiment of FIGS. 1 and 2.

The production of the exhaust gas catalytic converter shown in FIGS. 1 and 2 is described below with reference to FIG. 3. The carrier body 13 is produced by spiral winding of a bandlike or striplike smooth sheet-metal layer 14 and a bandlike corrugated sheet-metal layer 16. Before the carrier body 13 is wound up, the desired number of heating elements 18, 20 is laid, spaced-apart, in the corrugated shape of the corrugated sheet-metal layer 16. In the ensuing winding up of the carrier body 13, the electrical heating elements 18, 20 are firmly bound into the structure of the carrier body 13. With this kind of production method, a subsequent incorporation of the electrical heating elements into the structure of the carrier body 13 is eliminated. Particularly firm binding and thus a particularly strong carrier body 13 are also attained. The cylindrical heating elements shown in FIG. 4 also contribute to increasing the strength of the carrier body 13.

Since the electrical heating elements 18, 20, 22, 24 are constructed to be self-insulating, no further insulation provisions need to be made on the carrier body 13. Insulation layers, which in the known models lead to a decrease in strength of the carrier body 13, can thus be eliminated.

In a non-illustrated embodiment, instead of the cylindrical heating elements, flat or foil-like heating elements are provided, which are applied to the smooth band 14. Since such heating elements are flexible, a spiral structure of a carrier body can also be attained with them. However, it is also possible, again in a non-illustrated manner, to produce a carrier body built up in layers.

A further embodiment of the invention is diagrammatically shown in FIG. 5. A catalytic converter 80 shown therein has a cylindrical jacket housing 82, which receives a non-illustrated carrier body. The carrier body, which is produced of sheet-metal layers, is produced by the fundamentally known star winding technique disclosed in German Patent DE 40 16 276 C1. That carrier body likewise includes spaced-apart smooth sheet-metal layers, and corrugated sheet-metal layers are disposed in the interstices. In the production of the catalytic converter, before the carrier body is wound, a preformed electrical heating element 84 is introduced between the stacked sheet-metal layers, in a shaping which is shown in FIG. 5. Electrical heating elements that are suitable for this kind of shaping are basically available on the market. As is shown in the drawing, the tubular electrical heating element has a three-dimensional, meandering shaping. The electrical leads of the heating element 84, which are disposed on end regions, are connected to a power supply 86 of the motor vehicle.

In this embodiment of the invention as well, because of the self-insulating heating element 84, no further insulation provisions that could impair the strength of the carrier body are needed. On the contrary, the strength of the carrier body is further increased by the meandering electrical heating element 84. Since the heating element 84 is distributed uniformly over the entire cross-sectional area of the catalytic converter 80, rapid and uniform heating is attained. As a result, localized overheating on the carrier body cannot occur.

With the embodiments described above, rapid and uniform heating of the catalytic converters according to the invention is possible. As a result, high efficiency of the catalytic converters is attained especially quickly. The self-insulating heating elements that are used require no further insulation provisions, so that great strength of the carrier body is attained.

We claim:

1. An exhaust gas catalytic converter, comprising:
   a flow channel for carrying exhaust gas;
   a carrier body disposed in said flow channel, said carrier body being formed of sheet-metal layers, at least some of said sheet-metal layers being corrugated, and said sheet-metal layers defining interstices for guiding exhaust gas flow therethrough;
   a catalytic coating disposed on at least some of said sheet-metal layers of said carrier body; and
   at least one heating element in addition to and separate from said carrier body, said heating element having a cross-section substantially corresponding with a cross-section of one of said interstices, being disposed in said one of said interstices, being electrically insulated from said sheet-metal layers, and being in direct contact with at least one of said catalytic coating and said sheet-metal layers, for electrically heating said carrier body.

2. The catalytic converter according to claim 1, wherein said at least one heating element is at least one cylindrical or bar-shaped electrical heating element having a diameter corresponding to the cross-section of said one of said interstices defined by said sheet-metal layers.

3. The catalytic converter according to claim 1, wherein said at least one heating element is at least one bar-shaped heating element.

4. The catalytic converter according to claim 3, wherein said corrugated sheet-metal layers have a corrugation shape corresponding to the diameter of said heating element.

5. The catalytic converter according to claim 1, wherein said sheet-metal layers of said carrier body include at least one spirally wound smooth sheet-metal layer together with said at least some corrugated sheet-metal layers defining said interstices for conducting exhaust gas flow therethrough, said at least some corrugated sheet-metal layers being disposed between wound layers of said at least one smooth sheet-metal layer, and said at least one heating element being a plurality of bar-shaped heating elements each being laid in one of said interstices and spaced apart from one another.

6. The catalytic converter according to claim 2, wherein said carrier body has end surfaces, said at least one electrical heating element has opposed leads being extended out of said end surfaces, and including a voltage source being connected to said leads.

7. The catalytic converter according to claim 6, including a jacket housing for said carrier body, said at least one electrical heating element being a plurality of electrical heating elements, said leads of said plurality of electrical heating elements associated with a respective one of said end surfaces being connected to one another.

8. The catalytic converter according to claim 1, wherein said sheet-metal layers are disposed in said carrier body according to a star winding technique, and said at least one heating element having a pre-formed three-dimensional structure and having a shape corresponding to said interstices of said carrier body and being introduced into said carrier body.

9. The catalytic converter according to claim 8, wherein said at least one heating element has a three-dimensional meandering structure.

10. The catalytic converter according to claim 1, wherein said at least one heating element is a plurality of heating elements being distributed throughout said carrier body.

* * * * *

UNITED STATES PATENT AND TRADEMARK OFFICE
CERTIFICATE OF CORRECTION

PATENT NO. : 5,562,885
DATED : October 8, 1996
INVENTOR(S) : Juergen Bayer, et. al.

It is certified that error appears in the above-indentified patent and that said Letters Patent is hereby corrected as shown below:

Title page, item [73], Assignee's city should read--Lohmar--.

Signed and Sealed this

Fourteenth Day of January, 1997

Attest:

BRUCE LEHMAN

*Attesting Officer*  *Commissioner of Patents and Trademarks*